United States Patent

[11] 3,585,275

| [72] | Inventors | George W. Gillemot<br>2331 20th St., Santa Monica, Calif. 90405;<br>John T. Thompson, 244 Loring St., Los<br>Angeles, Calif. 90024 |
|---|---|---|
| [21] | Appl. No. | 12,617 |
| [22] | Filed | Feb. 19, 1970 |
| [45] | Patented | June 15, 1971 |

[54] KIT AND METHOD FOR ENCAPSULATING CONDUCTOR SPLICE CONNECTIONS
16 Claims, 5 Drawing Figs.

[52] U.S. Cl. .................................................. 174/76,
29/426, 29/592, 174/87, 174/135
[51] Int. Cl. ............................................. H02g 15/04
[50] Field of Search .......................................... 174/1, 10,
52.6, 74, 74.1, 76, 77, 87, 135, 138, 138.4;
339/114, 115, 116; 206/47 A, 47 R; 29/592, 426;
53/36

[56] References Cited
UNITED STATES PATENTS

| 997,066 | 7/1911 | Krannichfeldt............... | 174/87 |
| 2,160,313 | 5/1939 | Norres............................ | 174/87 |
| 2,906,810 | 9/1959 | D'Ascoli........................ | 174/87 |
| 3,419,669 | 12/1968 | Dienes............................ | 174/76 X |
| 3,519,728 | 7/1970 | Gillemot........................ | 174/76 |

*Primary Examiner*—Laramie E. Askin
*Attorney*—Sellers and Brace

ABSTRACT: An encapsulating kit and method for protecting conductor splice connections utilizing a mass of nonconducting nonsetting gellike composition to protect them from moisture, corrosion, electrolytic action and the like hazards. The encapsulating composition has pronounced cohesive properties and ability to retain its integrity centrally of an impervious enclosure provided with a thick open-cell resilient lining. Splice connections can be added and withdrawn at will and the characteristics of the encapsulating composition remain stable indefinitely under wide range temperature conditions.

PATENTED JUN 15 1971

3,585,275

INVENTORS
GEORGE W. GILLEMOT
JOHN T. THOMPSON
BY
ATTORNEYS

KIT AND METHOD FOR ENCAPSULATING CONDUCTOR SPLICE CONNECTIONS

This invention relates to an encapsulating assembly, and more particularly to a simple inexpensive kit of components requiring a minimum of skill and dexterity for its use and providing highly reliable protection for splice connections against a wide variety of hazards encountered in the field.

Heretofore it has been common practice to hermetically seal conductor splice connections in a body of potting compound which solidifies into a solid mass impervious to liquids and gas and having good insulating characteristics. Certain of these solidifying potting compounds soften upon being heated while others polymerize into a permanent solid mass from which the splice connections can be freed only by destroying the compound. These prior encapsulating techniques, although quite satisfactory in certain applications, are highly unsatisfactory in others. Additionally, these prior potting techniques are subject to the serious disadvantage of requiring considerable equipment and expertise on the part of the operator. Furthermore, once the compound takes a set it is impossible to add or remove conductors except at considerable cost in time and effort.

By the present invention the foregoing and other shortcomings or prior encapsulating techniques are avoided and a simple readily utilized technique is made available in lieu thereof and exhibiting far greater versatility and flexibility while retaining the safeguards provided by prior techniques. The invention encapsulating method is particularly advantageous in connection with smaller conductors and under conditions having need for encapsulating splice connections temporarily without interfering with the accessibility of the splice connections for checking, testing and the like purposes.

Primary protection against liquid, gases, stray currents and other hazards is provided by an encapsulating composition having a permanent and stable gellike consistency impervious to gases, liquids and fluids generally and providing excellent electrical insulating characteristics. A mass of this composition is preferably surrounded, except for an access opening with an open celled resilient layer enclosed within a suitable wrapper. The encapsulating composition has pronounced coherence properties and ability to remain intact in a single mass under highly unfavorable conditions. Advantageous utilization of this property is achieved by employing a thick resilient liner comprising a network of interconnected filaments cooperating to form voids to receive the gellike composition. The cell-forming filament readily cuts through the gellike material as its coherency properties keep the mass intact in the pocket formed by the open topped liner. An insulating composition having the desired gellike properties and characteristics comprises about 85 percent petrolatum heat blended with about 15 percent low density polyethylene.

Accordingly, it is a primary object of the present invention to provide a novel encapsulating kit assembly and method of utilizing the same to protect electrical conductors and splice connections both temporarily and permanently.

Another object of the invention is the provision of an improved mode and kit of components for protecting and isolating electrical terminals from contact and attack by fluids and foreign object generally.

Another object of the invention is the provision of simple, inexpensive components usable by semiskilled persons to encapsulate electrical splice connections in a manner providing a high degree of protection against many hazards without foreclosing access to any or all of the splice connections continuously and as desired for testing, checking and modification of circuitry.

Another object of the invention is the provision of splice kit encapsulating assembly utilizing a permanently gellike insulative composition surrounded by a resilient impervious enclosure to isolate the splice connections from hazardous atmospheres, fluids and foreign objects generally.

These and other more specific objects will appear upon reading the following specification and claims and upon considering in connection therewith the attached drawing to which they relate.

Referring now to the drawing in which a preferred embodiment of the invention is illustrated:

Figure 3:
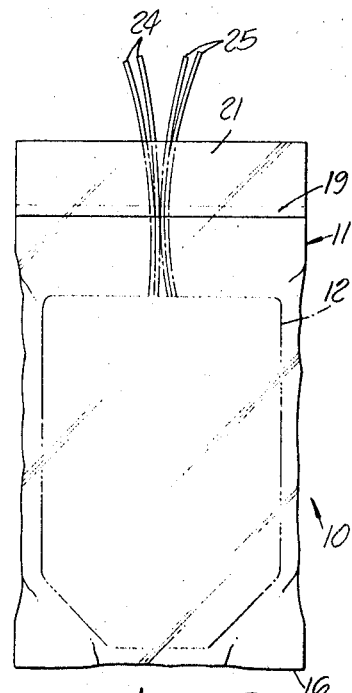
FIG. 3 is a side view of the assembly shown in FIG. 2 but on a reduced scale with the access opening closed on either side of the conductors.
Figure 4:
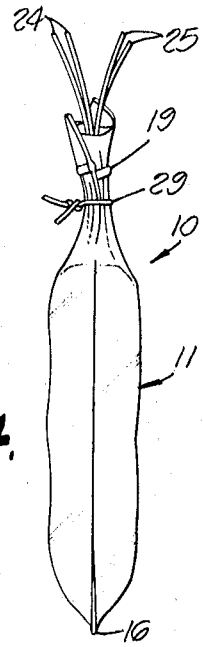
Figure 5:
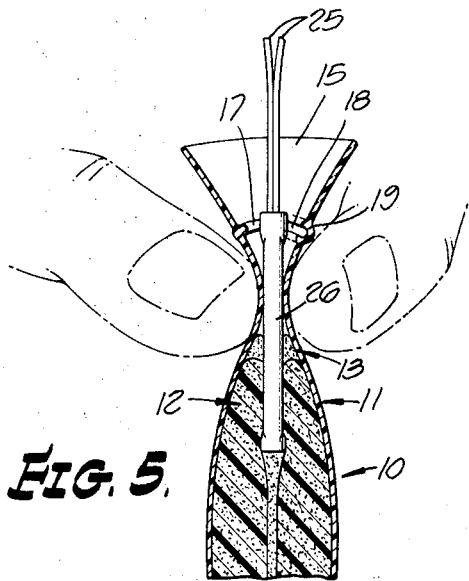

FIG. 4 is a view similar to FIG. 3 but showing the access end portion of the impervious encapsulating wrapper gathered by a tie band; and FIG. 5 is a cross sectional view on an enlarged scale through the access opening of the encapsulating wrapper showing an operator's fingers disposed to retain the encapsulating gel within the wrapper as a splice connection is being withdrawn from the wrapper for some purpose.

Figure 1:
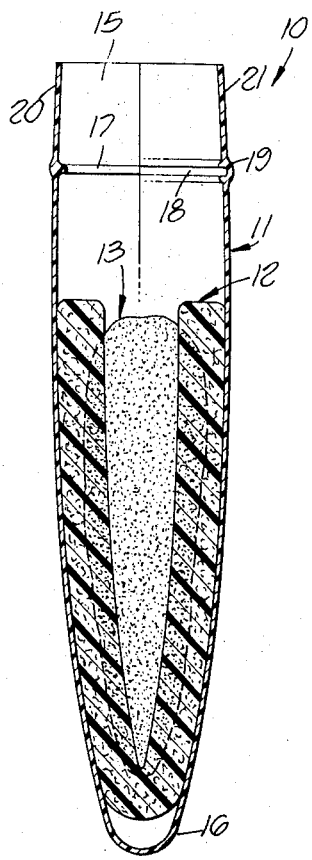
FIG. 1 is a longitudinal cross sectional view through an illustrative encapsulating kit embodying the principles of this invention with the access end open and in readiness to receive wire splice components.
Figure 2:
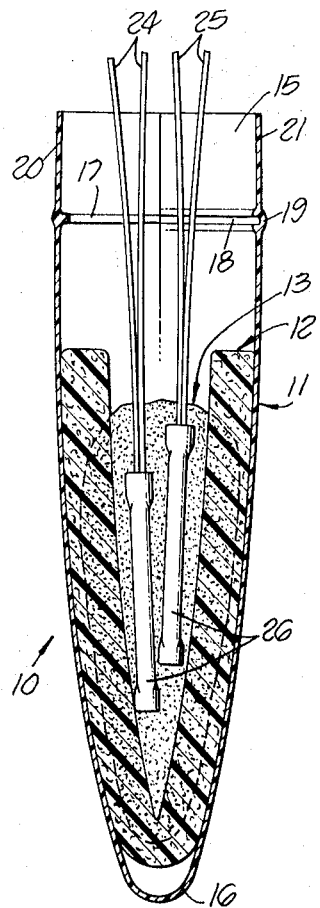
FIG. 2 is a view similar to FIG. 1 but showing two pairs of spliced conductor terminals submerged in the gellike insulative compound.

Referring to the drawing and more particularly to FIGS. 1 and 2, there is shown a typical embodiment of the invention encapsulating kit, designated generally 10, comprising an outer impervious wrapper 11, an open-celled spongy liner 12 and a mass of nonsetting encapsulating material 13. Prior to assembly of the components to encapsulate conductor terminals, encapsulating composition 13 may be conveniently packaged in a collapsible container having a nozzle for use in dispensing a desired quantity of the compound into wrapper 11. Alternatively, the described components 11, 12, 13 may be assembled in the relationship shown in the drawing and in readiness to receive conductor splices.

Wrapper 11, as herein shown, comprises an open-top receptacle or bag having an access opening 15 at one end. This wrapper may be formed from suitable flexible impervious sheet thermoplastic material, such as polyethylene, polyvinylchloride or any one of numerous other similar well known thermoplastic compositions. Wrapper 11 may be formed in any suitable shape, such as a flattened tube closed at its lower end 16. For convenience in holding the wrapper closed, the opposite sidewalls of access opening 15 are molded to form an interlocking seam comprising a male member 17 shaped to interlock with a complementally contoured C-shaped groove 18 of female portion 19 of the seam. Member 17 readily interlocks in groove 18 by applying finger pressure to the exterior surfaces of the wrapper opposite these parts. Separation of the seam is accomplished equally expeditiously by grasping the opposite sidewalks 20, 21 of the wrapper and pulling the same away from one another to release member 17 from groove 18.

The spongy liner 12 may be formed from any suitable open celled porous material. A particularly suitable liner is formed from a resilient thermoplastic material having pronounced resiliency and comprising a multiplicity of filaments interlocked with one another at points of crossover or merger and cooperating to form cells having a multiplicity of open sides in direct communication with similar adjacent cells. It will be understood that numerous other porous resilient and spongelike liner materials readily available in the market place may be used with highly satisfactory results. Desirably, liner 12 conforms generally to the interior configuration of wrapper bag 11 and is open only at one end in alignment with access wrapper opening 15. The liner need not be attached to the inner wall of the wrapper but preferably has a snug fit therewithin. Normally a thin film of the encapsulating gel 13 adheres to the adjacent surfaces of the liner and the interior surface of the wrapper and serves in a highly satisfactory manner to hold the parts against displacement relative to one another, particularly during withdrawal of splice connections from the gel.

Encapsulating compound 13 is readily formulated from petrolatum and low density polyethylene powder. Approximately 85 percent by weight of petrolatum is heat-blended with 15 percent by weight of low density polyethylene. The resulting material is a highly stable, gellike composition having very pronounced viscous and coherency properties over a wide temperature range of approximately 208° F. to −40° F. The material remains workable throughout this temperature range.

Other important properties and characteristics of the encapsulating material include high dielectric properties, nonsolubility in water, and nonabsorbent as respects atmospheric gasses and commonly encountered airborne contaminants. Composition 13 safeguards against corrosion and oxidation of conductors, prevents fluids and moisture from penetrating therethrough to conductors embedded therein, and provides excellent protection against electrolytic action and the passage of stray currents.

Particularly noteworthy is the fact that encapsulating compound 13 has such pronounced viscous and coherency properties strongly resisting subdivision into a plurality of discreet masses within the wrapper. Thus, if a mass of the composition is introduced into the open top of the liner pocket, it tends to spread the opposite interior walls apart as portions penetrate into adjacent cells of the liner. If pressure is applied to the opposite sidewalls of the wrapper, the mass penetrates further into the liner. Upon release of the pressure, liner walls expand to their normal thickness as the encapsulating material retrenches and collects into a compact mass centrally of the liner and wrapper.

In use, the described kit is assembled as shown in FIG. 1, the sidewalls 20,21 of access opening 15 being pulled apart in readiness to receive the parts to be encapsulated. Two splice connections are shown in FIG. 2 each comprising a pair of typical insulated conductors 24,25 having their exposed ends secured together and enclosed in a suitable splice enclosure. As herein shown the splice enclosure includes thin tubes 26 of heat reactive or the like insulative material inserted over the exposed ends of the joined conductor terminals and suitably anchored in place as by the application of heat and/or pressure to interlock the enclosures with the wires.

These spliced ends having been prepared in well-known manner, they are encapsulated simply by inserting the splice ends 26 downwardly through opening 15 until submerged in the mass of gellike encapsulating material 13. Any desired number of splice connections can be inserted in similar manner, care being taken to note that the splice ends are fully submerged in compound 13. Thereafter, the interlocking seam members 17,18 are pressed together by pressing the fingers against the exterior sides of wrapper 11 opposite the seam members. The presence of the lead wires across portions of the seam prevents closing the seam throughout its full length. However, the seam parts immediately to either side of the contracted group of lead wires readily interlock with one another and remain in this condition until forcibly separated. Accordingly, the completed encapsulating assembly may be readily handled without risk of the seam opening. However, further assurance against inadvertent opening is provided by gathering the upper end of wrapper 11 overlying the upper end of liner 12 and holding it so gathered by applying a ductile wire tie 29 about the gathered material and twisting the ends together in the manner clearly illustrated in FIG. 4. Under these conditions the encapsulation assembly will withstand rough handling and abuse generally. Pressure applied to the exterior of the wrapper may temporarily displace some of the compound and compress liner 12 but the splice connections remain submerged in compound 13 and fully protected from moisture and elements generally.

If at a later date it is desired to add more splice connections or to test or remove any group of splice conductors, it is a simple matter to reopen the wrapper by removing tie 29 and pulling the interlocked seam parts 17 and 18 out of assembled relation. In removing a spliced set of wires, the operator preferably places his thumb and forefinger against the opposite side of wrapper 11 in the area immediately below seam parts 17,18. The other hand is then used to pull upwardly on a selected group of wires as pressure is applied through the wrapper against the sides of the splice protector 16. In this manner, all except a thin film of the encapsulating material is retained within wrapper 11. Accordingly, splice connectors can be inserted and removed repeatedly without risk of depleting the supply of gel objectionably.

While the particular kit and method for encapsulating conductor splice connections herein shown and disclosed in detail is fully capable of attaining the objects and providing the advantages hereinbefore stated, it is to be understood that it is merely illustrative of the presently preferred embodiment of the invention, and that no limitations are intended to the details of construction or design herein shown other than as defined in the appended claims.

We claim:

1. An encapsulating assembly for use in protecting splice connections between electrical conductors and isolating the same from liquids, gases, electrolytic reaction and the like deleterious effects, said assembly comprising an impervious wrapper having an access opening through which splice connections can be inserted, a thick-walled porous open-celled resilient liner enclosed within said wrapper, a mass of homogenous insulative material of gellike consistency embraced by said liner and into which splice connections can be inserted until submerged in said gellike mass, and means for closing the access opening of said wrapper about the conductors joined together by said splice connections.

2. An encapsulating assembly as defined in claim 1 characterized in that said mass of gellike material is viscous and resistant to separation into disjointed portions, said gellike material having pronounced tendencies to remain intact in a single mass despite compression pressures applied against the exterior of said wrapper sufficient to cause full penetration of said material by the thickness of said resilient liner, and outer surface portions of said resilient liner readily expanding away from the central mass of material upon relaxation of compression pressures from the exterior of said wrapper.

3. An encapsulating assembly as defined in claim 1 characterized in that said wrapper comprises an envelope of flexible thermoplastic sheet material.

4. An encapsulating assembly as defined in claim 3 characterized in that the access opening of said envelope includes self-interlocking closure means extending along the sidewall of said access opening and readily closed by applying pressure to the interlocking parts thereof from the opposed exterior sides of said access opening.

5. An encapsulating assembly as defined in claim 1 characterized in that said resilient liner comprises a deep bag closed except for an inlet opening aligned with the access opening of said impervious wrapper.

6. An encapsulating assembly as defined in claim 1 characterized in that said gellike nonconductive material comprises a melted blend including petrolatum as its principal constituent admixed with low density polyethylene.

7. An encapsulating assembly as defined in claim 1 characterized in that said gellike nonconductive material comprises a melted blend of petrolatum and low density polyethylene which blend possesses pronounced coherence and viscous characteristics.

8. An encapsulating assembly as defined in claim 1 characterized in that said gellike nonconductive material comprises as principal ingredients in the order of 85 percent petrolatum heat-blended with the order of 15 percent low density polyethylene.

9. An encapsulating assembly as defined in claim 1 characterized in that a plurality of independent conductor splice connections are submerged in said mass of gellike material, and means holding said access opening of said wrapper contracted snugly about the conductors leading to said splice connections.

10. That method of encapsulating splice connections between conductors to protect the same from contact with moisture, corrosive atmospheres, and electrolysis potentials, said method comprising: submerging completed conductor splice connections into a mass of permanently gellike nonconductive nonsetting material having pronounced cohesive properties substantially surrounded with a thick resilient open-celled layer encased in an impervious retaining enclosure having an access opening, and closing said access opening about said conductors.

11. That method defined in claim 10 characterized in the step of withdrawing a splice connection from said mass of gellike material for servicing, inspection and the like operations while applying light finger pressure against the conductors to be withdrawn by grasping said retaining enclosure between the thumb and forefinger and applying pressure against the conductors while being withdrawn from said enclosure thereby to wipe off said gellike material and retain the same captive within said enclosure along with the main body thereof.

12. That method defined in claim 10, characterized in the step of utilizing thin-walled flexible sheet material for said impervious retaining enclosure.

13. That method of protecting splice connections against contact by fluids, vapors, stray electrical currents, contaminants and the like which method comprises: providing a mass of nonconductive nonabsorbent material of highly stable nonsetting gellike consistency, surrounded with thick resilient highly porous material enclosed within an impervious protective cover having a normally closed opening through which conductor splice connections can be inserted, submerging a prepared splice connection between a plurality of conductors through the opening in said protective cover and into said mass of gellike material, and closing said opening about the juxtaposed portions of said conductors.

14. A wire terminal protective and encapsulating kit for use about a group of insulated wire junctions, said kit comprising an outer protective enclosure of thin flexible impervious material having at least one access opening for wires, a thick walled liner of porous spongy material supported within said enclosure having an access opening aligned with said one access opening, a charge of gellike insulating compound interiorly of said thick-walled liner in the path of wire junctions to be inserted thereinto through said aligned access openings and effective to protect the wire junctions from contact with foreign fluids while submerged in said compound, and said compound retaining the gellike consistency thereof over a wide range of atmospheric temperatures and having pronounced viscous properties and tendencies to remain in place about a group of wire junctions submerged therein despite repeated compression and expansion of said thick walled liner.

15. A protective kit as defined in claim 14 characterized in the provision of means for holding said one access opening normally closed.

16. A protective kit as defined in claim 14 characterized in that said outer protective enclosure projects substantially beyond the adjacent portion of said thick-walled liner and includes said one access opening.